J. A. H. HATT.
CAMERA STAND.
APPLICATION FILED FEB. 24, 1906.
904,613.
Patented Nov. 24, 1908.
2 SHEETS—SHEET 1.
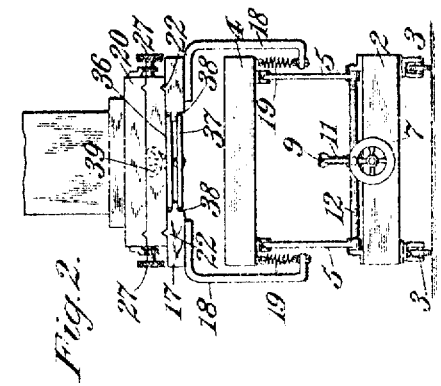
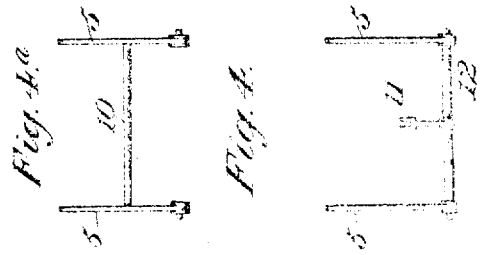
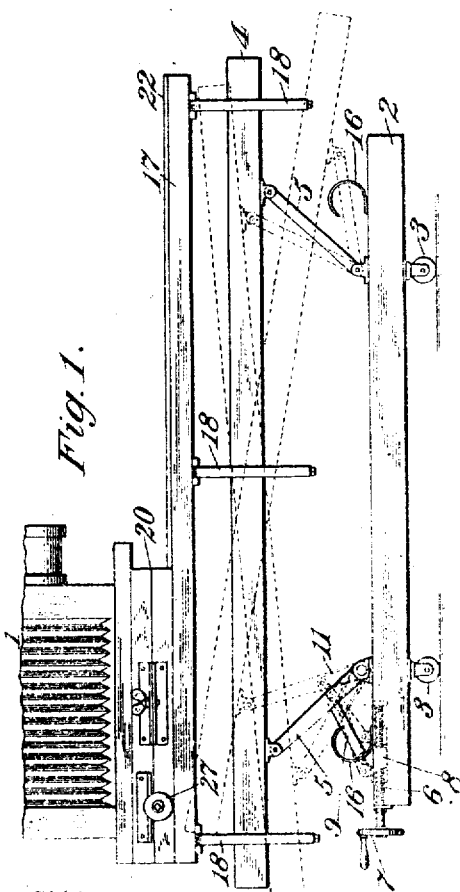
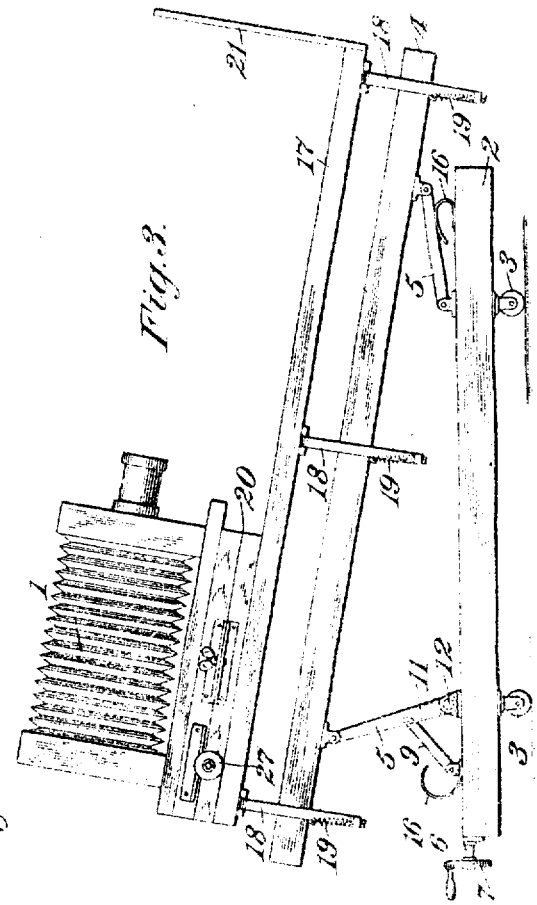
Witnesses:
Inventor:
J. A. H. Hatt
By John D. Morgan
Attorney.

J. A. H. HATT.
CAMERA STAND.
APPLICATION FILED FEB. 24, 1906.

904,613.

Patented Nov. 24, 1908.

3 SHEETS—SHEET 2.

Inventor
J. A. H. Hatt
By John S. Morgan
Attorney

J. A. H. HATT.
CAMERA STAND.
APPLICATION FILED FEB. 24, 1906.
904,613.
Patented Nov. 24, 1908.
3 SHEETS—SHEET 3.
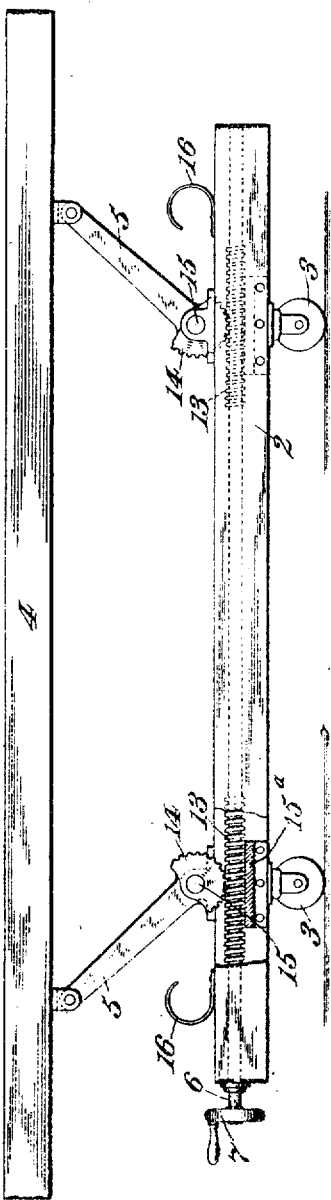
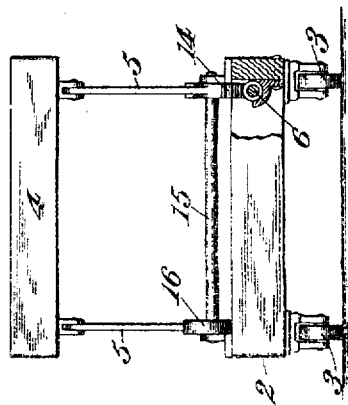
Witnesses:
M. B. Morgan
Clara Phillips
Inventor,
J. A. H. Hatt
By John D. Morgan
Attorney.

UNITED STATES PATENT OFFICE.

JOSEPH ARTHUR HENRY HATT, OF BROOKLYN, NEW YORK.

CAMERA-STAND.

No. 904,613.  Specification of Letters Patent.  Patented Nov. 24, 1908.

Application filed February 24, 1906. Serial No. 302,823.

*To all whom it may concern:*

Be it known that I, JOSEPH ARTHUR HENRY HATT, a citizen of the United States, residing at Brooklyn, in the county of Queens and State of New York, have invented new and useful Improvements in Camera-Stands, of which the following is a specification.

The invention relates to cameras and more particularly to mechanisms and arrangements for supporting, manipulating and adjusting cameras.

In many of its features the invention relates more especially to process cameras, that is, those used in connection with the photo-mechanical reproduction processes. In other of its features, however, the invention is applicable to other kinds of cameras.

Objects of the invention are to provide simple, reliable and efficient means for supporting and manipulating the camera; to provide means having the characteristics described which will provide for all desired movements of the camera; to provide for a fine and accurate adjustment of the camera bodily with reference to the stand which shall be simple, reliable and at the same time add little to the bulk of the camera and stand; to provide means for tilting the camera at any desired angle and for positively holding the camera and support to position at all times when either stationary or in movement; to provide simple and efficient devices for firmly holding the camera in any position to which adjusted; to provide a resilient support for the camera which is simple and efficient and adapted to coöperate with other of the devices and features mentioned. These and other objects of invention will in part be obvious and will in part more fully appear hereinafter.

The invention consists in the novel parts, articles, arrangements, improvements and combinations herein set forth.

The accompanying drawings, referred to herein and forming a part hereof, illustrate one embodiment of the invention and serve in connection with the description herein to explain the principles thereof.

Figure 5:
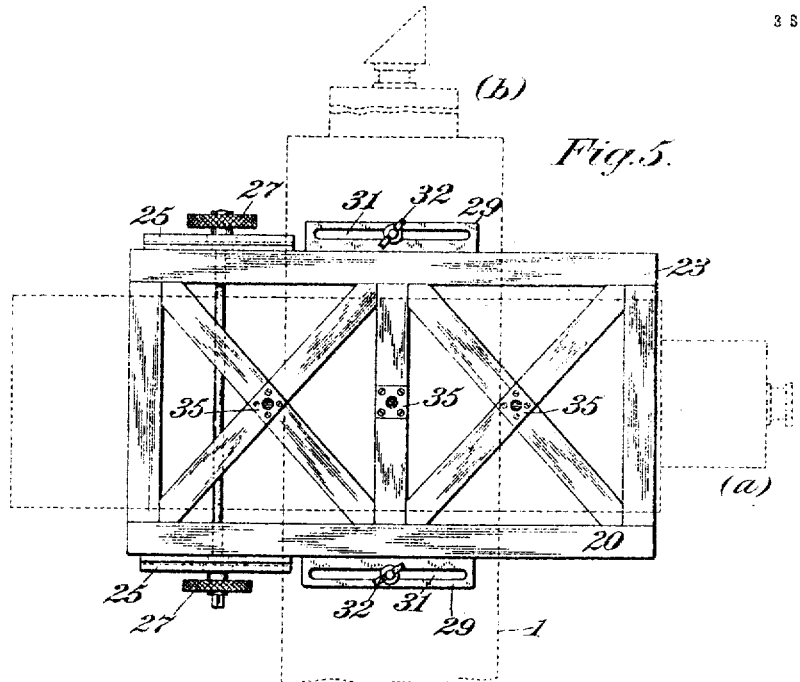
Figure 6:
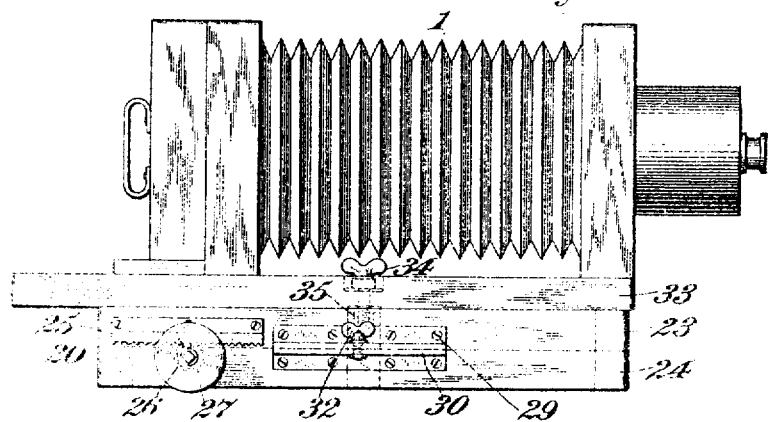
Figure 7:
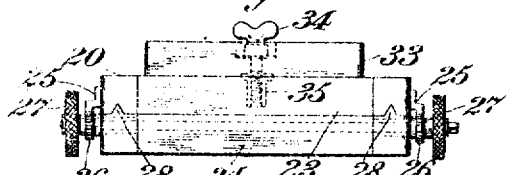

Of the drawings: Figure 1 is a side elevation of a machine constructed in accordance with certain features of the invention; Fig. 2 is an end elevation; Fig. 3 is a side elevation showing a different position of parts; Figs. 4 and 4ᵃ are detail views; Fig. 5 is a plan view of a part of the camera-supporting devices; Fig. 6 is a side elevation of a camera and supporting devices; Fig. 7 is an end view of part of the structure shown in Fig. 6; Fig. 8 is a side elevation of a modified form of certain of the supporting devices; and Fig. 9 is an end elevation of same.

A machine constructed in accordance with certain features of the invention includes a support for the camera which has a base adapted to rest upon the floor and a superposed structure for supporting a camera, the said parts being constructed and adapted to have relative movement with respect to each other so that the supporting member may be inclined at any desired angle to the base member, thereby imparting any desired inclination to the camera also, and means are provided for giving a minute control and adjustment for the said movement and to positively hold the said devices to position at all times irrespective of the location of the camera upon its support, thereby preventing any sudden lurching of the apparatus due to the weight and position of the camera and allowing of accurate, positive and expeditious adjustment. According to certain features of the invention the camera may be carried in any desired manner upon the said support, the necessary requirements being that the camera and the copy be kept in proper relation and that the camera be movable toward and away from the copy. According to other features of the invention, however, it is contemplated that the camera be resiliently carried upon a support of the character described; it is further contemplated that the camera be freely and resiliently suspended from the support and at the same time be disposed over the support, thus providing a strong, simple and effective means of preventing vibration or jar to the camera and also disposing it so as to be freely accessible to the operator, which is so important a feature with regard to cameras. Other features of the invention have in contemplation the mounting of the camera in such manner as to provide an accurate and expeditious adjustment of the camera toward and from the copy and for also manipulating the camera so that it may be employed on the same bed for use in direct work with the lens or for work with the prism or reversing mirror. These features of the invention will be set forth more at length hereinafter.

Referring to the particular embodiment of the invention illustrated by way of example in the drawings herewith, a camera is indicated generally by the reference numeral 1. As the invention does not relate to the structure of the camera especially, the showing thereof is somewhat conventional, as cameras of the kind to which the invention is especially adapted are usually provided with a large variety of devices and appliances for accurate and expeditious work. In the said embodiment there is shown a base 2 which may be of any suitable or convenient form. The said base is shown herein as provided with casters or trunnions 3 for convenience in moving the camera and support from place to place. Carried upon a plurality of supports by the said base and so as to be capable of inclination at various angles thereto, is a support or table 4. As heretofore indicated, means are provided for moving and at all times positively holding the said base and table with respect to each other so that the table may be inclined with reference to the base at any desired angle and will be held against any unintentional movement when at rest or in motion. A form of means for so moving and holding the said parts to their intended relative positions is illustrated herein as comprising a plurality of non-parallel supports 5 pivotally connected to the base 2 and also to the table 4. The said supports 5 are shown as two in number, and as each comprising a pair of arms disposed side by side transversely of the base 2 and table 4 and the two supports are shown as being located well towards the opposite ends of the base and table, longitudinally considered. It will be understood, however that the invention in many of its features is not limited to the particular form and disposition of the supports. The said supports in addition to being non-parallel are at different angles with respect to the table when the table is at any given inclination with reference to the base so that upon movement of the said supports the table carried thereby will assume different angles of inclination with reference to the base. The form of holding and moving means comprises two members in positive engagement, herein shown as in threaded engagement, with each other, one of said members being pivotally connected to one of the supports. The other of said members may be carried by the base or by the table. The said second member of the moving and holding means may be conveniently mounted in the base, as the actuating means for the said members may then be in a fixed position at all times and will be more quickly and certainly found by the operator. It will be seen that by relative movement of the two threaded members the supports and table will move with respect to the base and the desired inclination be thereby given to the table. In Figs. 1, 2 and 3 of the drawings a form of said moving and holding means is shown as comprising a screw rod 6 mounted to rotate in the base 2 and being provided with suitable actuating means such as a hand wheel 7. Carried upon the said screw threaded rod 6 and in engagement therewith is shown a traveling nut 8. The said nut is further shown as being pivotally connected to one set of supporting arms 5 by link 9. The said link may be connected to a cross rod 10, as shown in Fig. 4$^a$, between the arms of the support 5, or to a crank arm 11 carried by rock shaft 12 upon which the arms of the support 5 are mounted, or in any other suitable and convenient manner. It will be obvious that a similar set of connections could be applied to the remaining support 5, if found desirable or convenient, and by the extension of the rod 6 with a reverse thread thereon, the two devices could be operated simultaneously from a single device, such as the hand wheel. This arrangement is not shown in the drawings, as it is generally analogous to that shown for a different form of the moving and holding means in Figs. 8 and 9 of the drawings.

In Figs. 8 and 9 of the drawings a form of the moving and holding means is shown in which a rod 6 is provided with a worm thread 13 with which meshes a toothed sector 14 carried upon a shaft 15 to which the support 5 is fixed. Means for preventing any springing or sagging of the thread 13 with reference to the sector 14 is provided and is shown herein in the form of a bearing plate 15$^a$ arranged opposite to the sector 14 with reference to the thread 13. Both the supports 5 are shown in the said figures as being provided with connections to the rod 6. Suitable buffers for the purpose of preventing injurious impact or contact between the parts and also for equalizing the strain may be provided, if desired, and a form thereof is shown herein as curved springs 16 carried upon the bed and adapted to contact with the supports 5 as they swing downwardly.

In the present embodiment the camera is not shown as supported directly upon the table 4 as according to certain features of the invention, and as hereinbefore indicated, it is contemplated to provide a resilient support for the camera and also means for moving and manipulating it as may be found necessary. In accordance with the said features, means are provided for mounting the camera with respect to the table 4 so that it may be freely and resiliently supported and at the same time be in a position to permit easy access thereto. In the form of such means illustrated herein is comprised a bed 17 arranged above but also suspended from the table. For effecting this the bed 17 is shown provided with a plurality of downwardly projecting members 18 which extend below the table 4.

Means are provided for supporting the bed 17 in proper relation to the table 4, the form of such means herein shown being such as to provide a resilient suspension of the bed 17 from the table 4, the said suspension means being also constructed so as to swing freely in order that the bed 17 may maintain a parallel relation, or other desired relation, to the table 4 as it is tilted at various angles. The form of such means herein shown comprises spiral springs 19 connected to the table 4 and to the downwardly projecting members 18.

The invention contemplates devices for moving the camera bodily toward and away from the copy holder for the purposes of positioning the image upon the plate and for controlling the size of the reproduction and also for changing the position of the camera so that the lens may be used directly or with the reversing prism or mirror as hereinbefore indicated. Means for effecting these results are shown in the illustrated embodiment as comprising a camera-carrying member mounted on the resiliently mounted bed, said member being constructed and arranged to permit of a sliding and a rotating movement of the camera. The sliding movement will provide for effecting the positioning and size of the image, and the rotating movement will permit of the camera being given a quarter turn with respect to the copy holder so as to provide for direct lens work or the use of a reversing device. The camera-carrying member in the form of such means illustrated herein comprises a member slidable longitudinally of the bed 17 and a member rotatable with reference to the bed 17. In the form of such means herein illustrated the slidable member is shown as mounted directly upon the bed 17 and the rotatable member as being mounted upon the slidable member. The slidable member comprises a sled 20 which may be provided, if desired, with a rabbet 22 for positioning and guiding it upon the bed 17. The bed 17 may be provided at one end with a convenient and suitable copy holder shown conventionally herein and indicated by the reference numeral 21.

While the sled 20 may be moved bodily to get an approximate adjustment of the camera as to distance from the copy holder, it will be found in practice that it is very difficult to get a satisfactory and fine adjustment of the camera by such bodily movement of the sled or other sliding means. The invention contemplates, therefore, providing the sled with a fine, accurate and positive adjustment and also with means for positively holding or clamping the parts in position after adjustment. With this end in view the particular embodiment illustrated herewith shows the sled as comprising two members 23 and 24 slidable with reference to each other, one member being provided with a rack 25 and the other with a pinion 26. Suitable actuating means for the said pinion may be provided, such as a hand wheel 27. The said slidable members 23 and 24 are provided with suitable means for keeping them in relative position such as the rabbet joint 28. Means for positively holding or clamping the said slidable members to adjusted position may be provided, as above indicated, and a form of such means is shown herein as comprising plates 29 and 30 fixed upon the said members and sliding upon each other face to face. One of said plates is shown provided with a slot 31 in which is located a thumb screw 32 threaded into the other plate, or both plates may be slotted and the member 32 be the thumb nut of a suitable clamping bolt. It will thus be seen that after the camera has been approximately positioned with reference to the copy holder by the bodily movement of the sled with reference to the bed 17, the final adjustment may be very accurately and quickly obtained by the rack and pinion and when so adjusted the parts may be quickly and firmly clamped into position. It will be understood that extended movement of the sled is generally very infrequent but that some slight adjustment of the camera with reference to the copy holder is frequently necessary for almost every exposure, hence it will be seen that the device just described is of great practical utility. The camera itself is provided with suitable focusing devices for getting the proper relation between the lens and the plate, said devices not being shown herein as they constitute no part of the present invention.

As previously indicated the form of camera moving and positioning means herein illustrated embodies a member rotatably carried upon the sled 20 upon which the camera itself is supported and as herein shown a camera bed 33 is mounted upon the sled so as to have a movement of rotation with respect thereto. The parts of the camera may be movable with reference to each other to bring the lens and plate into proper focal relation. This may be effected in any desirable or convenient way, as for instance by having the front or rear of the camera 1 slidable with reference to the camera bed 33, by means of suitable devices, such as a rack and pinion. Such devices are not shown herein as they are well known and merely as such form no part of this invention. Any suitable means for rotatably mounting the camera bed may be proand as herein shown a thumb screw 34 is loosely carried in the bed and has threaded engagement with a socket 35 carried in the upper member of the camera sled. If desired the camera sled may be provided with a plurality of the socket plates 35. It will be understood that by loosening the thumb screw 34 slightly the camera may be swung a quarter turn into either desired position and may then be quickly and firmly fastened in the adjusted position. In Fig. 5 of the drawings the camera is conventionally shown in dotted line in position (a) for direct use of the lens and in position (b) for use with a reversing device.

Means may be provided, if desired, for firmly holding the sled 20 to position with reference to the bed 17 and in Fig. 2 of the drawings a form of such means is shown as comprising two plates 36 and 37, the plate 36 being fast to the lower member of the sled 20 and the plate 37 being suspended from the plate 36 by the thumb-bolt 39. Between the two plates 36 and 37 tenons 38 integral with the bed 17 extend. It will, therefore, be obvious that when the thumb-bolt 39 is turned the plate 37 will be drawn toward the plate 36 so as to clamp the tenons 38 therebetween. The sled 20 and the bed 17 will thus be clamped together. It will thus be seen that devices are provided for securely clamping together the camera bed 33 and the camera sled 20 and the bed 17 or any two of them, if desired.

From all the foregoing the manner of operation of the various devices herein shown and described will be understood by those skilled in the art and it will be further understood that an embodiment of the invention has been provided which realizes the objects and advantages hereinbefore set forth, together with other objects and advantages.

The invention, in its broader aspects, is not limited to the particular constructions shown, nor to any particular constructions by which it has been or may be carried into effect, as many changes may be made in the construction within the scope of the claims without departing from the main principles of the invention and without sacrificing its chief advantages.

What I do claim as my invention and desire to secure by Letters Patent, is:

1. A support for a camera including in combination a base, a table, a plurality of supports pivoted, non-slidably both to said base and to the said table, and means for moving the said supports, said parts being so constructed and arranged that movement of the supports will cause a tilting movement of the table with respect to its base.

2. A support for a camera including in combination a base, a table pivotally supported upon said base at a plurality of points, and means for moving and holding the table angularly relatively to the base and for at all times positively holding the table in position relatively to the base.

3. A support for a camera including in combination a base, a table, a plurality of non-parallel supports pivoted to the base and to the table, said supports being at different angles respectively to the table when the table is at a given inclination with reference to the base, and means for moving the said supports.

4. A support for a camera including in combination a base, a table, a plurality of non-parallel supports pivoted to the base and to the table, said supports being at different angles respectively to the table when the table is at a given inclination with reference to the base, and means for moving and at all times positively holding said supports to position.

5. A support for a camera including in combination a base, a table, a plurality of non-parallel supports for supporting the said table above said base, and means for moving and at all times positively holding said supports to position.

6. A support for a camera including in combination a base, a table, a plurality of non-parallel supports for supporting the said table above said base, and two members in threaded engagement with each other for tilting the table relatively to the base, one of said threaded members being pivotally connected to one of the said supports.

7. A support for a camera including in combination a base, a table, a plurality of non-parallel supports for supporting the said table above said base, and two members in threaded engagement with each other for tilting the table relatively to the base, one of said threaded members being pivotally connected to one of the said supports and the other of said threaded members being carried by the base.

8. A support for a camera including in combination a base, a table, a plurality of non-parallel supports pivoted to the said table and also to the base, a threaded screw rod carried by the base, and a nut mounted upon the said screw rod and having a pivoted connection with one of said supports.

9. A support for a camera including in combination a base, a table, a plurality of non-parallel supports pivoted to the base and pivoted also to the table, and two members in movable but constant positive engagement with each other, one of said members being connected to the said supports, and the other to the base so as to positively position the table at a desired inclination and to positively hold it at all times.

10. A support for a camera including in combination a base, a table, means for tilting the table with reference to the base, and a bed suspended from the said table so as to swing freely.

11. A support for a camera including in combination a base, a table, means for tilting the table with reference to the base, and a bed resiliently suspended from the said table.

12. A support for a camera including in combination a base, a table, means for inclining the table with reference to the base and for holding it in inclined position, said means being constructed and arranged to positively hold the table both while moving and at rest, and a bed resiliently carried by the said table.

13. A support for a camera including in combination a base, a table, means for tilting the table with reference to the base, and a bed arranged above and also suspended from the table.

14. A support for a camera including in combination a base, a table, means for tilting the table with reference to the base, a bed arranged above the table, said bed being provided with downwardly projecting members, and springs connecting said table and said projecting members so that the bed is resiliently supported from the said table.

15. A support for a camera including in combination a base, a table, a plurality of non-parallel supports pivoted to said base and said table, means for moving said table relatively to the base, and a bed arranged above the table and being also suspended from said table.

16. A support for a camera including in combination a base, a table, non-parallel supports pivoted to said table and to said base near their ends, a threaded screw rod carried by the base, a nut threaded upon the said rod and pivotally connected to one of said supports, a bed arranged above said table, said bed having downwardly projecting portions extending on each side of and below the level of the table, and springs connecting the table and the said downwardly projecting portions.

17. The combination with a camera of a support therefor, said support having a base, a tiltable table carried by said base, a bed resiliently suspended from said table so as to swing freely, and a camera-carrying member movably mounted on said bed.

18. The combination with a camera of a base, a table, means for tilting the table with reference to the base, a bed arranged above but resiliently suspended from the said table, and a camera-carrying member slidably mounted on said bed.

19. The combination with a camera of a base, a table, a plurality of non-parallel supports pivoted to the said table and to the base, means for moving and at all times positively holding the table to position at any desired inclination with reference to the base, and means for supporting and sliding the camera with reference to the table.

20. The combination with a camera of a base, a table, a plurality of non-parallel supports for tilting the table with reference to the base, means for moving said supports and for positively holding them at all times, a bed arranged above but resiliently suspended from the said table, and a camera-carrying member slidably mounted on said bed.

21. The combination with a camera of a base, a tiltable table carried thereby, a bed resiliently carried by said table, and a camera-carrying member mounted on said bed, said member being constructed and arranged to permit of a sliding and a rotating movement of the camera.

22. The combination with a camera of a base, a table, means for tilting the table with reference to the base, a bed resiliently carried by said table, a sled carried upon said table, said sled comprising two portions slidable with reference to each other, and a camera bed rotatably mounted upon said sled.

23. The combination with a camera of a base, a tiltable bed arranged above said base, means for moving and for at all times positively holding the said bed to position, and a plurality of camera-supporting members carried by the said bed, said supporting members being constructed and arranged so as to provide for a sliding and also a rotary movement being imparted to the camera.

24. The combination with a camera of a support therefor, a camera sled movable relatively to the said support and comprising two members slidable with reference to each other, a rack on one of said members, a pinion on the other of said members, and a camera bed mounted upon the said sled, the camera being supported upon the said bed.

25. The combination with a camera of a support therefor, a camera sled movable relatively to the said support and comprising two members slidable with reference to each other, a rack on one of said members, a pinion on the other of said members, and a camera bed rotatably mounted on the said sled.

26. The combination with a camera of a support therefor including a camera sled comprising two members slidable with reference to each other, a rack on one of said members, a pinion on the other of said members, means for rotating said pinion, a clamp for clamping the said members together, and a camera bed rotatably mounted on the said sled.

27. The combination with a camera of a support therefor comprising a base, a bed resiliently carried thereby, a sled slidably mounted upon the said bed, a camera bed rotatably mounted upon the said sled, and devices for rendering the camera bed, the camera sled and the resiliently supported bed fixed with respect to each other.

28. The combination with a camera of a support therefor including a base, a bed resiliently mounted upon the said base, a camera sled slidable upon the said bed, a camera bed rotatably mounted upon the said sled, means for clamping the camera bed to the sled, and means for clamping the sled to the said resiliently mounted bed.

29. The combination with a camera of a base, a table, supports pivoted to the said base and to the said table, a screw-threaded rod, a nut threaded thereon, the said nut being pivotally connected to the said supports to tilt the table with reference to the base and to positively hold it to position at all times, a bed resiliently mounted upon the said table, a copy holder mounted upon the said bed, a camera sled slidable upon the said bed, and a camera bed rotatably mounted upon the said sled.

30. The combination with a camera of a base, a table, supports pivoted to the said base and to the said table, a screw-threaded rod, a nut threaded thereon, the said nut being pivotally connected to the said supports to tilt the table with reference to the base and to positively hold it to position at all times, a bed arranged above but resiliently supported from the said table, a copy holder carried by the said bed, a camera sled slidable upon the said bed, said camera sled comprising two slidable portions connected by a rack and pinion, a camera bed rotatably mounted upon the said camera sled, means for clamping the camera bed to the camera sled, and means for clamping the camera sled to the resiliently supported bed.

31. A support for a camera including in combination a base, a table, a plurality of supports connected both to said base and to said table, but not connected to each other, and means for moving the said supports.

32. A support for a camera including in combination a base, a table, a plurality of supports pivoted both to said base and to said table, but not connected to each other, and means for moving the said supports.

33. A support for a camera including in combination a base, a table, a plurality of non-parallel supports for supporting the said table upon said base, and means for giving angular movement to the said supports simultaneously in the same direction.

In testimony whereof I have signed my name to this specification in the presence of two subscribing witnesses.

JOSEPH ARTHUR HENRY BATT.

Witnesses:
JOHN D. MORGAN,
CLARA PHILLIPS.